(12) United States Patent
Seely et al.

(10) Patent No.: US 11,102,421 B1
(45) Date of Patent: Aug. 24, 2021

(54) LOW-LIGHT AND/OR LONG EXPOSURE IMAGE CAPTURE MODE

(71) Applicant: Apple Inc., Cupertino, CA (US)

(72) Inventors: Richard D. Seely, San Jose, CA (US); Giancarlo Todone, Mountain View, CA (US); Hao Sun, San Jose, CA (US); Farhan A. Baqai, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/996,375

(22) Filed: Aug. 18, 2020

Related U.S. Application Data

(60) Provisional application No. 62/897,831, filed on Sep. 9, 2019.

(51) Int. Cl.
*H04N 5/262* (2006.01)
*H04N 5/235* (2006.01)
*H04N 5/232* (2006.01)
*H04N 5/353* (2011.01)

(52) U.S. Cl.
CPC ....... *H04N 5/2353* (2013.01); *H04N 5/23216* (2013.01); *H04N 5/353* (2013.01)

(58) Field of Classification Search
CPC ............. H04N 5/2355; H04N 5/23232; H04N 5/23216; H04N 5/353; H04N 5/2353; G06T 2207/20221; G06T 5/50; G06T 2207/20208
See application file for complete search history.

(56) References Cited

U.S. PATENT DOCUMENTS

| 10,306,139 | B2 * | 5/2019 | Baqai | H04N 5/23229 |
|---|---|---|---|---|
| 2015/0350509 | A1 * | 12/2015 | Tico | H04N 5/2355 348/362 |
| 2018/0302544 | A1 * | 10/2018 | Dhiman | G06T 7/246 |
| 2018/0316864 | A1 * | 11/2018 | Molgaard | H04N 5/23267 |
| 2019/0335077 | A1 * | 10/2019 | Rieveschl | H04N 5/23212 |

* cited by examiner

*Primary Examiner* — Kelly L Jerabek
(74) *Attorney, Agent, or Firm* — Blank Rome LLP

(57) ABSTRACT

An incoming image stream may be obtained from an image capture device operating in low-light conditions and/or a simulated long exposure image capture mode. As images are obtained, a weighting operation may be performed on the pixels of the captured images to generate and/or update an accumulative weight map, wherein the weighting is based, e.g., on the proximity of the captured pixels' values to the respective image capture device's maximum observable pixel value. As batches of images are obtained, they may be fused, e.g., according to the accumulative weight map, in a memory-efficient manner that places an upper limit on the overall memory footprint of the fusion operations, to simulate an actual long exposure image capture. In some embodiments, the weight map may be stored at a lower resolution than the obtained images and then upscaled, e.g., via the use of guided filters, before being applied in the fusion operations.

20 Claims, 5 Drawing Sheets

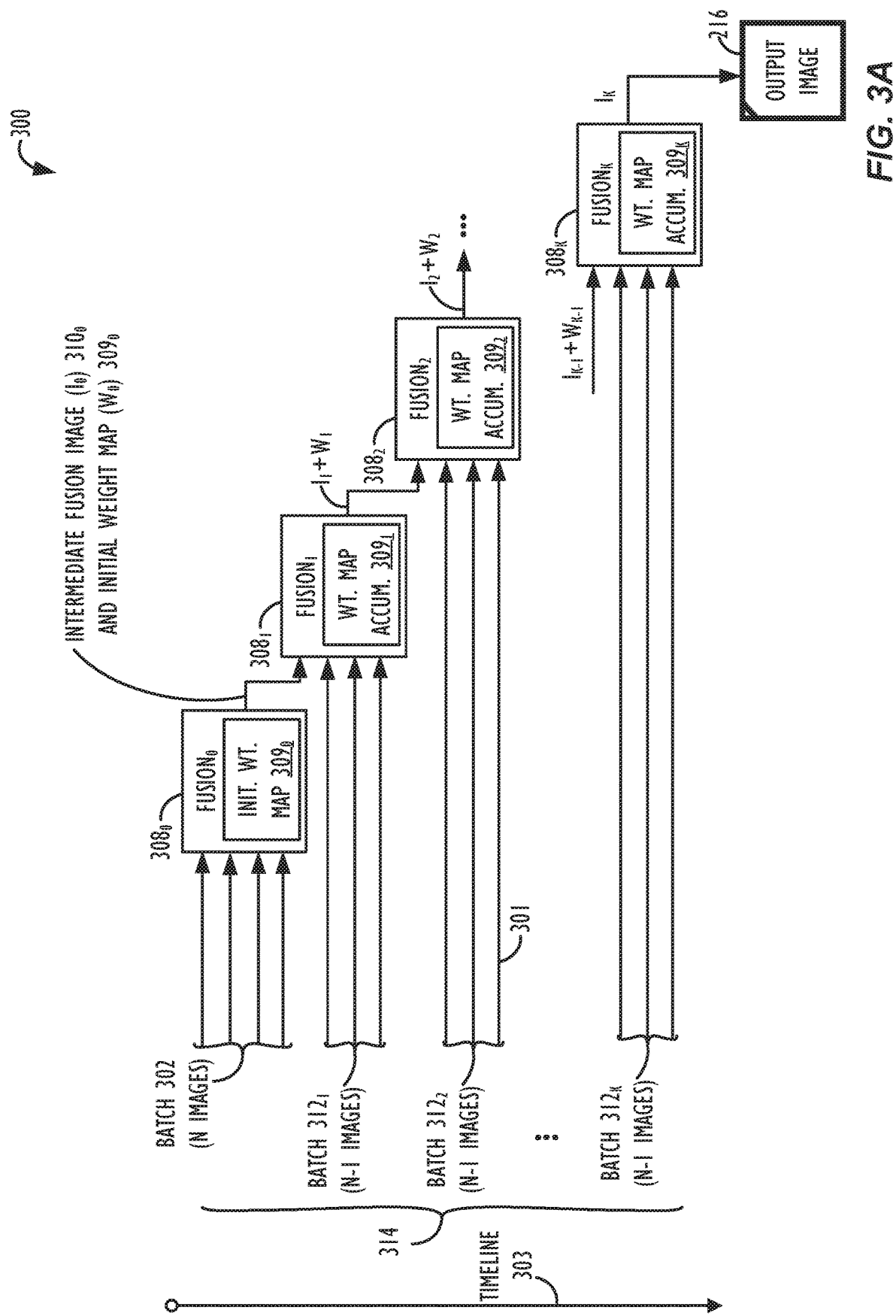

LOW-LIGHT AND/OR LONG EXPOSURE IMAGE CAPTURE MODE

TECHNICAL FIELD

This disclosure relates generally to the field of digital image processing. More particularly, but not by way of limitation, it relates to techniques for a memory-efficient approach to image fusion, in order to generate fused images in a wide variety of image capturing conditions, including stationary image capture in low-light conditions and/or with long exposure times.

BACKGROUND

Often, when image capture devices are operated in long exposure image capture modes, the relatively large amount of time that passes while an image (or images) of the scene are being captured by the image capture device can result in region(s) of the resultant long exposure image having content that changes dramatically over the time interval during which the image (or images) of the scene were captured. This change in content may, e.g., be caused by the motion of objects within the scene during the capture time interval, which may create "motion blurring" or "color trails" (e.g., in the case of moving point light sources) artifacts in the resultant long exposure image.

When the light intensity from a point light source in the scene, e.g., a moving point light source, is clipped by an image sensor of the image capture device (i.e., the image sensor becomes saturated at a particular pixel location(s)), the point light source's true color/intensity may be under-represented in the resultant long exposure image, particularly if the resultant long exposure image is formed in a "simulated" fashion, e.g., via a subsequent fusion operation of multiple individual images captured during the time interval. In particular, if a point light source is only present at a given pixel location of the resultant long exposure image in a small number of the multiple captured images that are fused together to produce the resultant long exposure image, it may cause an incorrect or inaccurate color representation of the given pixel location in the resultant long exposure image. Thus, it is desirable to avoid improperly representing the color and/or intensity of moving point light sources when fusing multiple image frames together for the purpose of simulating a single exposure, long exposure image capture, as might be taken by a traditional digital single-lens reflex (DSLR) camera.

In some image capture scenarios where fusion operations will be employed, e.g., when the image capture device is stationary during the image capture operations, i.e., exhibiting less than a predetermined minimum threshold amount of motion over a predetermined time interval, there may not be a need to register/align the captured images prior to fusion operations, due to the fact that all of the captured images will already be spatially aligned. Moreover, in some lighting conditions, e.g., low-light conditions, it may be very difficult to perform image registration successfully, due to the captured images having a low signal-to-noise ratio (SNR). Finally, if registration is employed in such stationary capture scenarios, any registration error may result in misalignment between the captured images, and thus potentially degrade the quality of an output fused image.

Fusing multiple images of the same captured scene is generally an effective way of increasing the SNR in a resulting fused image, i.e., as compared to the SNR of any of the individual images contributing to the fusion operations. This is particularly important for small and/or thin form factor devices—such as mobile phones, tablets, laptops, wearables, etc.—for which the pixel size of the device's image sensor(s) and/or the aperture/lens of the device's camera unit are often quite small. The smaller pixel size and/or smaller apertures/lenses means that there may be comparatively less light captured per pixel (i.e., as compared to a full-sized, standalone camera, e.g., a DSLR, having larger pixel sizes), resulting in more visible noise in captured images-especially in low-light situations.

In some prior art image fusion schemes, the type and/or number of bracketed exposures, i.e., images, captured by the image capture device may be predetermined, e.g., determined before an image capture request is received from a user of the image capture device and without consideration of the lighting conditions or composition of the scene being captured. In such schemes, the predetermined set of bracketed exposures may have been determined a priori, e.g., in an attempt to capture the number (and types) of image resources that are typically able to achieve a satisfactory fusion result across a wide variety of image capture situations.

However, due to varying light levels and/or camera/subject motion detected during capture, it may not be possible to make such predeterminations in certain image capture modes, e.g., image capture modes designed to simulate stationary, e.g., tripod-mounted, long exposure images captured by a traditional, e.g., DSLR, camera. Further, simulating long exposure image capture, e.g., via the fusion of multiple individual images captured during a capture time interval, may also result in the capture of a larger number of images than the image capture device can hold in memory at one time, which may also present additional challenges in memory-limited, e.g., mobile, electronic image capture devices.

Thus, what is needed are memory-efficient approaches to image fusion that may be employed, e.g., in low-light conditions and/or simulated long exposure image capture modes. Because the number of individual images captured in such simulated long exposure image capture modes may be quite large (and/or unknown at the beginning of the image capture operations), it may also be desirable to utilize techniques that place an upper limit on the overall memory footprint of the fusion operations-regardless of how many individual images are captured. In such approaches, it may also be desirable to represent point light sources or other highlight regions in the captured scene (e.g., which may result in dipped pixel values being captured by the image sensor) in a manner similar to the representation of such highlight regions in actual long exposure images, e.g., as captured by traditional DSLR cameras, that is, with appropriate motion blurring and/or light trails.

SUMMARY

Electronic devices, methods, and non-transitory program storage devices for performing a more memory-efficient approach to image fusion are described herein. Such approaches may be utilized to simulate the effect of long exposure image capture in traditional, e.g., DSLR, cameras, while preventing (or accounting for) image sensor saturation, allowing for the preview of the simulated long exposure image in real-time (i.e., as it is being captured by a user), and allowing a user to stop the capture operations when desired.

According to some embodiments, a low-light condition and/or simulated long exposure image capture mode may either be detected by an image capture device or set in response to user input. When an image capture request is received, and the image capture device is operating in such a low-light condition and/or simulated long exposure image capture mode, an incoming image stream may begin to be obtained from the image capture device. According to some embodiments, one or more capture parameters for each of a set of subsequent image capture operations for the image capture device may be determined, wherein the one or more capture parameters may comprise a target exposure time value and/or gain value for a respective subsequent image capture operation. As the set of images are captured by the determined subsequent image capture operations, they may be registered and fused in a memory-efficient manner that, e.g., places an upper limit on the overall memory footprint of the registration and fusion operations-regardless of how many images are captured in the determined set. Some embodiments may also attempt to more accurately represent point light sources (or other highlight regions in the captured scene) that cause one or more pixels on an image sensor of the image capture device to become saturated during the capture operations, e.g., via the use of one or more pixel weighting operations.

According to some embodiments, the determined capture parameters for the subsequent images to be captured by the image capture device may comprise parameters specifying the subsequent capture of, e.g.: one or more EV0 images, one or more EV-images, and/or one or more long exposure (e.g., EV+) images. (Further explanations of these various types of images are provided below.) In some embodiments, the determined set of images to be subsequently captured may be comprised of two or more sub-sets of repeating patterns of images, e.g., the determined capture parameters may specify the capture of a set of images comprising five consecutive subsets of one EV0 and one EV+ image, resulting in a final set of ten images comprising 5 EV0 images and 5 EV+ images. This image set composition is purely illustrative, and the compositions of determined image sets to be captured in various types of lighting conditions and/or scene compositions may be tailored based on the needs of a given implementation. In some instances, a noise reduction process may also be performed, e.g., on one or more of the captured images, prior to and/or after the fusion operation. In other instances, noise reduction may be performed only on the resultant fused image.

As mentioned above, in some embodiments, the image fusion schemes disclosed herein may be designed to place an upper limit on the overall memory footprint of the registration and fusion operations-regardless of how many images are captured during the course of the image capture operations. Such schemes may be referred to herein as "progressive" image fusion schemes. According to some progressive image fusion schemes, the overall fusion operation is broken down into a number of individual fusion operations on smaller sub-sets or "batches" of images that are captured in a temporal sequence. The results of the fusion operation on the smaller batch of images (along with one or more other images, as desired) may then be carried forward and used as one (or more) of the inputs to the fusion operation on the next captured batch of images. In this way, at least some amount of information from each of the captured images may be carried forward through the overall fusion operation, while limiting the necessary memory footprint of the fusion operation to the size of: one batch of images plus any images or fusion results carried forward from prior small batch fusion operations. In some embodiments, a low resolution accumulative fusion weighting map, e.g., storing the results of one or more pixel weighting operations performed on each captured image, may be one of the fusion results that is carried forward to each subsequent batch fusion operation. In this manner, the progressive fusion techniques described herein can essentially carry on indefinitely, without exceeding the predetermined memory footprints of the scheme, and the fusion results may be previewed in real-time and/or terminated whenever so desired by a user or so determined by the image capture device.

According to other embodiments, instructions may be stored on program storage devices for causing the one or more processors to: obtain a first batch of images captured by one or more image capture devices; perform a pixel weighting operation on each image in the first batch of images to output a weight map; perform a first fusion operation on the first batch of images according to the weight map to output a first fused image; designate the first fused image as a current intermediate fusion image; successively perform a subsequent fusion sequence at least one time, wherein each subsequent fusion sequence comprises: obtaining a subsequent batch of images captured by the one or more image capture devices; performing a pixel weighting operation on each image in the subsequent batch of images to output an updated weight map; performing a subsequent fusion operation on: the subsequent batch of images and the current intermediate fusion image according to the updated weight map to output an updated fused image; and designating the updated fused image as the current intermediate fusion image; and following completion of the last subsequent fusion sequence, store the current intermediate fusion image as an output fused image in a memory.

Various methods of performing memory-efficient image fusion techniques are also disclosed herein, in accordance with the program storage device embodiments enumerated above. Various programmable electronic devices are disclosed herein as well, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various program storage device embodiments enumerated above.

BRIEF DESCRIPTION OF THE DRAWINGS

FIG. 3A illustrates an overview of a process for performing memory-efficient image fusion operations, according to one or more embodiments.

DETAILED DESCRIPTION

Figure 1:
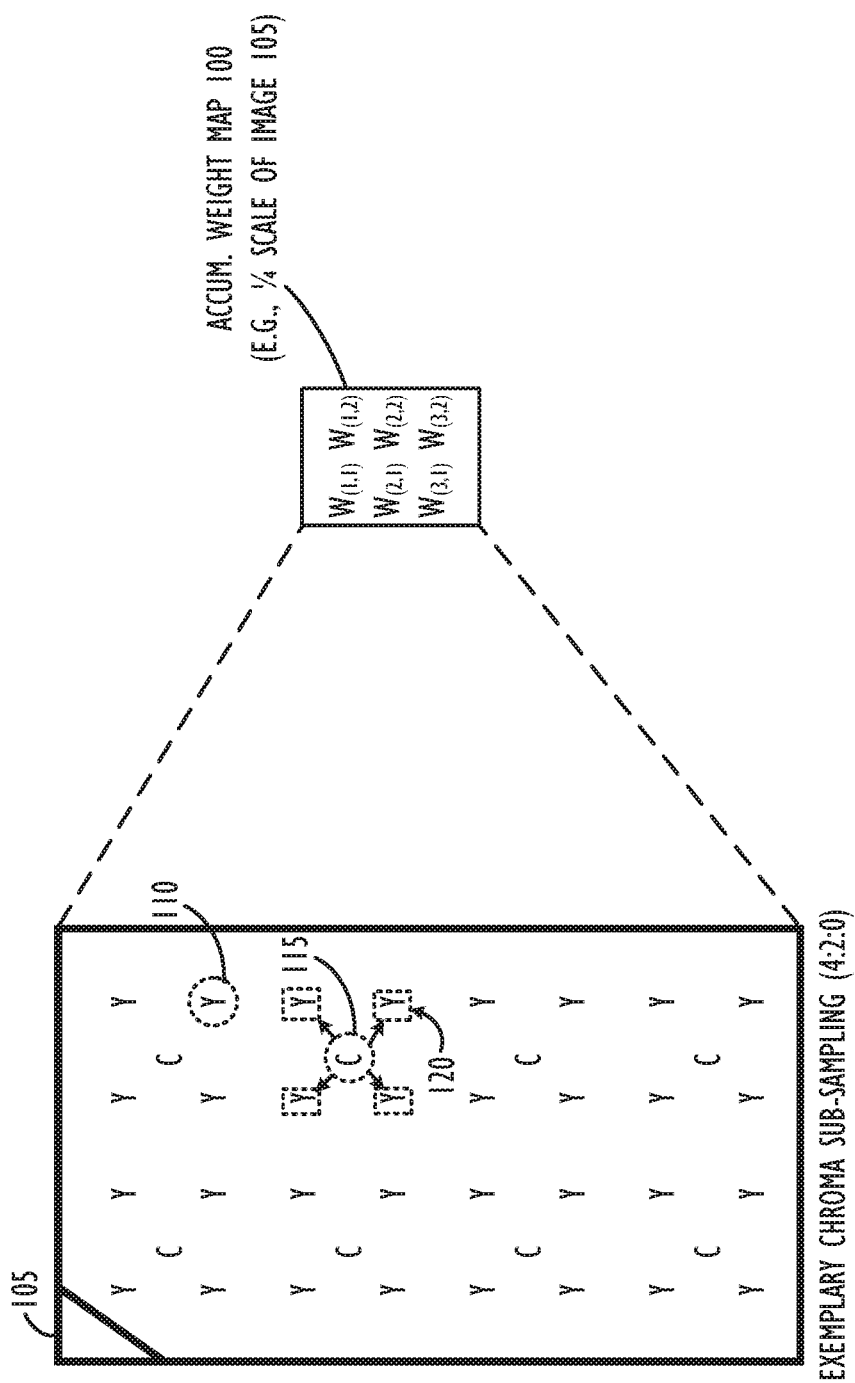
FIG. 1 illustrates an exemplary obtained image encoded using chroma sub-sampling and an exemplary corresponding weight map that may be used in subsequent fusion operations, according to one or more embodiments.

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" means that a particular feature, structure, or characteristic described in connection with the embodiments is included in at least one embodiment of one of the inventions, and multiple references to "one embodiment" or "an embodiment" should not be understood as necessarily all referring to the same embodiment.

Discussion will now turn to the nomenclature that will be used herein to refer to the various differently-exposed images that may be captured by an image capture device. As in conventional bracket notation, "EV" stands for exposure value and refers to a given exposure level for an image (which may be controlled by one or more settings of a device, such as an image capture device's shutter speed and/or aperture setting). Different images may be captured at different EVs, with a one EV difference (also known as a "stop") between images equating to a predefined power difference in exposure. Typically, a stop is used to denote a power of two difference between exposures. Thus, changing the exposure value can change an amount of light received for a given image, depending on whether the EV is increased or decreased. For example, one stop doubles (or halves) the amount of light received for a given image, depending on whether the EV is increased (or decreased), respectively.

The "EV0" image in a conventional bracket refers to an image that is captured using an exposure value as determined by an image capture device's exposure algorithm, e.g., as specified by an Auto Exposure (AE) mechanism. Generally, the EV0 image is assumed to have the ideal exposure value (EV) given the lighting conditions at hand. It is to be understood that the use of the term "ideal" in the context of the EV0 image herein refers to an ideal exposure value, as calculated for a given image capture system. In other words, it is a system-relevant version of ideal exposure. Different image capture systems may have different versions of ideal exposure values for given lighting conditions and/or may utilize different constraints and analyses to determine exposure settings for the capture of an EV0 image.

The term "EV–" image refers to an underexposed image that is captured at a lower stop (e.g., 0.5, 1, 2, or 3 stops) than would be used to capture an EV0 image. For example, an "EV–1" image refers to an underexposed image that is captured at one stop below the exposure of the EV0 image, and "EV–2" image refers to an underexposed image that is captured at two stops below the exposure value of the EV0 image. The term "EV+" image refers to an overexposed image that is captured at a higher stop (e.g., 0.5, 1, 2, or 3) than the EV0 image. For example, an "EV+1" image refers to an overexposed image that is captured at one stop above the exposure of the EV0 image, and an "EV+2" image refers to an overexposed image that is captured at two stops above the exposure value of the EV0 image.

For example, according to some embodiments, an image stream captured by an image capture device may comprise a combination of: EV–, EV0, EV+, and/or longer exposure images. It is further noted that the image stream may also comprise a combination of arbitrary exposures, as desired by a given implementation or operating condition, e.g., EV+2, EV+4, EV–3 images, etc.

According to some embodiments, long exposure images may comprise an image frame captured to be over-exposed relative to an EV0 exposure setting. In some instances, it may be a predetermined EV+ value (e.g., EV+1, EV+2, etc.). In other instances, the exposure settings for a given long exposure image may be calculated on-the-fly at capture time (e.g., within a predetermine range). For example, in some simulated long exposure image capture modes, e.g., wherein it is determined that the image capture device is stationary, the image capture device may intentionally capture one or more images during the capture time interval at a predetermined number of stops (e.g., 1 stop, 2 stops, etc.) above the EV0 setting determined by the image capture device's AE system. The determination of how many stops above the determined EV0 setting to capture images at may be an implementation choice, e.g., based on a tradeoff between capturing images with less noise and potentially facing more (and/or sooner) image sensor saturation and clipping.

According to some embodiments, in order to recover a desired amount of shadow detail in the captured image, some degree of overexposure (e.g., EV+2) may also intentionally be employed in bright scenes and scenes with medium brightness. To keep brightness levels consistent across the various captured images, the gain may be decreased proportionally as the exposure time of the capture is increased, as, according to some embodiments, brightness may be defined as the product of gain and exposure time. According to some embodiments, even images captured as EV0 images may still be modified in one or more ways, as may be desired by a given implementation, e.g., in terms of gain and exposure time combinations.

In some embodiments, the particular exposure time (and/or gain) of an image captured during a simulated long exposure image mode may be further based, at least in part, on ambient light levels around the image capture device(s), with brighter ambient conditions allowing for comparatively shorter image exposure times, and with darker ambient conditions allowing the use of comparatively longer image exposure times. In still other embodiments, the particular exposure time (and/or system gain) of a long exposure image may be further based, at least in part, on whether the image capture device is using an OIS system during the capture operation.

It is to be noted that the noise level in a given image may be estimated based, at least in part, on the system's gain level (with larger gains leading to larger noise levels). Therefore, in order to have low noise, an image capture system may desire to use smaller gain values. However, as discussed above, the brightness of an image may be determined as the product of exposure time and gain. So, in order to maintain the image brightness, low gains are often compensated for with large exposure times. Thus, as may now be understood, the exposure times of the individual images captured during a simulated long exposure image capture mode may not always be the maximum threshold exposure time allowed by the image capture device.

According to some embodiments, the image stream captured by an image capture device may comprise a particular default sequence of exposures. For example, according to some embodiments, the sequence of incoming images may comprise: EV0, EV+, EV0, EV+, and so forth. In other embodiments, the default sequence of incoming images may comprise only EV0 images or only EV+ images. The sequence of exposures may then continue, e.g., until a cancellation request is received from a user, the camera stops capturing images (e.g., when the user powers down the device or disables a camera application), and/or one when or more operating conditions may change.

Turning now to FIG. 1, an exemplary obtained image 105 encoded using chroma sub-sampling and an exemplary corresponding weight map 100 that may be used in subsequent fusion operations are illustrated, according to one or more embodiments. Image 105 is illustrated using so-called 4:2:0 chroma subsampling, wherein each chroma channel (C) 115, which may, e.g., comprise a blue chroma channel and/or a red chroma channel, is stored at half of the width and half of the height of the luminance channel (Y) 110. It is to be understood that the use of YCbCr encoding, and 4:2:0 chroma subsampling, specifically, in FIG. 1 are merely illustrative, and that any desired image encoding scheme may be used, according to the needs of a given implementation.

As illustrated in FIG. 1, weight map 100 is stored at a lower resolution than image 105, e.g., to increase memory efficiency in subsequent fusion operations. In some embodiments, e.g., the weight map 100 may be stored at a fractional resolution of the image 105 in each dimension, e.g., with weight map 100 having one-fourth of the width and one-fourth of the height of image 105. Due to its lower resolution, as will be described in further detail below, the values in weight map 100 may need to be upsampled, such that they may be applied to the luminance (and chrominance) values in the larger-resolution image 105. Likewise, after any updates have been made to the weight map during a given fusion sequence, the weight map may need to be downsampled again to its lower resolution before being passed on to subsequent fusion sequences, i.e., for subsequently-obtained batches of images.

In some embodiments, the weight map 100 comprises a plurality of individual fusion weight values ($W_{(1,1)}$, $W_{(1,2)}$, etc.), wherein each fusion weight value may correspond to one or more of the pixel sample values in one or more of the image channels of image 105. In some cases, as mentioned above, the weight map 100 may be carried forward to each subsequent fusion operation during the production of a resultant simulated long exposure image. In such embodiments, the weight map 100 may be referred to herein as an "accumulative" weight map, meaning that the fusion weight value for each position in the weight map 100 (wherein each position in the weight map corresponds to one or more pixels in the output fused image) may be incremented with each subsequent image that is captured and that will used in the subsequent fusion operations.

As will be explained in greater detail below with reference to FIG. 2, according to some embodiments, pixels having a value that is not equal to the image sensor's maximum observable value (or not within a threshold distance of the image sensor's maximum observable value) may simply be assigned a pixel weight of '1,' that is, the respective pixel location from the respective captured image will have a default or 'normal' level of influence on the resultant value of the pixel at the respective pixel location in the resultant fused image. On the other hand, in order to compensate for the aforementioned issues regarding the accuracy of pixel intensity and color reproduction for saturated or dipped pixel values during long exposure image captures, pixels having a value that is equal to the image sensor's maximum observable value (or within a threshold distance of the image sensor's maximum observable value) may be assigned a pixel weight of much greater than '1,' (e.g., '10,' or '100,' or '1,000,' or even '10,000' or more), that is, the respective pixel location from the respective captured image will have a much greater level of influence on the resultant value of the pixel at the respective pixel location in the resultant fused image than would a non-clipped pixel. This weighting scheme may be important for accurate color reproduction, as the light intensity falling on a given pixel of the image sensor may only saturate the image sensor for a single image out of many images that are captured during a given time capture interval. Because the true intensity of the point light source causing the clipped pixel value was likely many orders of magnitude in intensity greater than the image sensor's maximum observable values (e.g., a point light source having an intensity of 50,000 on an image sensor only capable of measuring signal values up to 1,023), the clipped pixel's influence on the subsequent fusion operations may be lost (i.e., when averaged together with many other pixel values at the respective pixel location that are much lower than the maximum observable value), unless the weight given to such a clipped pixel's value is "artificially" boosted via one of the aforementioned weighting operations to more accurately reflect the actual intensity of the point light source recorded by the clipped sensor pixel.

According to some embodiments, the pixel weighting values in the weight map may correspond to luminance channel values, i.e., rather than chroma channel values. In such instances, in order to correctly fuse the respective chroma channels in any subsequent fusion operations, the weight values for the four corresponding luminance pixels (represented by the four luminance samples enclosed in dashed-line boxes 120 in FIG. 1 for chroma sample 115) may be combined in an intelligent fashion, as will be described in more detail below.

Figure 2:
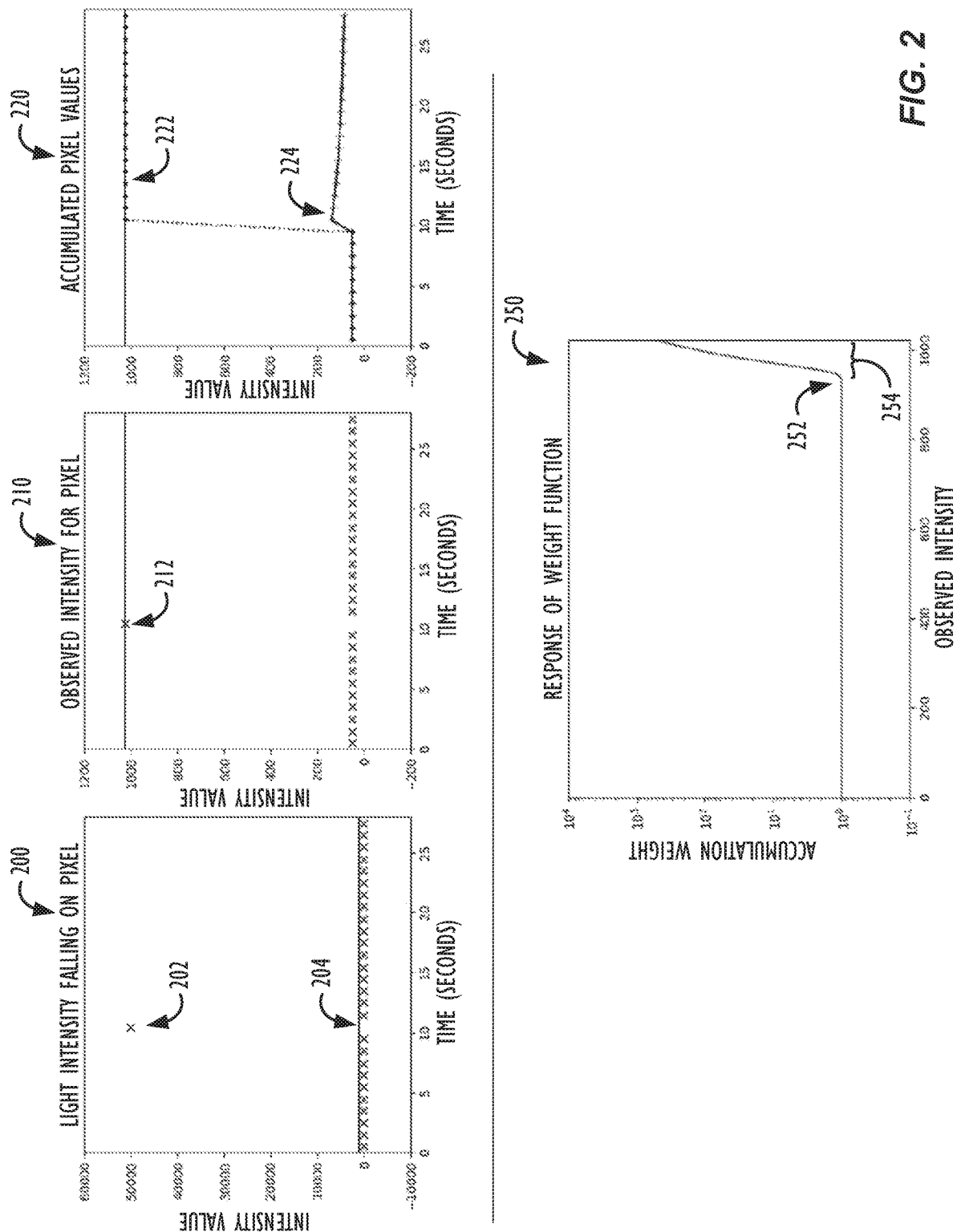
FIG. 2 illustrates various graphs related to the capture of image pixels whose actual intensity values exceed an image sensor's maximum observable pixel intensity value, according to one or more embodiments.

Turning now to FIG. 2, various graphs 200/210/220/250 related to the capture of image pixels whose actual intensity values exceed an image sensor's maximum observable pixel intensity value are illustrated, according to one or more embodiments.

Graph 200 illustrates the light intensity falling on a given hypothetical pixel on an image sensor over a capture time period of 30 seconds. Line 204 represents the saturation level of the image sensor, in this case 1,023. As illustrated, a point light source (represented by sample 202) fell on the hypothetical pixel only at one particular sample capture time, i.e., T=11s. However, at this time, the true light intensity falling on the pixel actually had a value of 50,000, although the image sensor was only capable of observing a maximum value of 1,023.

Graph 210 illustrates the actual observed intensity at the given hypothetical pixel of graph 200 over the same 30-second capture time period. As shown at sample 212, the image sensor only observes a value of 1,023 at the particular sample capture time of T=11s. The other observed values of the given hypothetical pixel over the capture time period are much smaller, e.g., on the order 50. As may now be understood, the fact that the point light source saturated the image sensor at time T=11 results in a situation where the sample 212 only has a recorded value that is about 20 times greater than the sampled values at the other capture times (i.e., 1,023 as compared to 50), when, in reality, the point light source actually had an intensity value that was about 1,000 times greater than the sampled values at the other capture times (i.e., 50,000 as compared to 50). As such, if not adjusted in some fashion (e.g., via a weighting operation), then the point light source will be underrepresented by a factor of 50 in resultant fusion operation (i.e., it will only be treated as being 20× brighter than the other sampled values, when it really was 1000× brighter), meaning its effect may not be seen at all—or may only be seen to such a diminished extent that the pixel in the resultant fused image is not identifiable as being part of a light trail of a moving point light source in the scene during the capture, as it would be in a traditional long exposure image taken by, e.g., a conventional DSLR camera.

Graph 220 illustrates the effect of this potential underrepresentation of saturated point light sources. In particular, as shown at line 222, the desired/ground-truth accumulated pixel values over the 30-second capture time period as would be captured by a traditional, i.e., single long exposure image capture, will remain at the fully saturated, i.e., 1,023 here, value for every time sample after the first time sample at which the image sensor pixel was saturated. Line 224 represents a simple running average of the observed intensity values of the hypothetical pixel over the capture time period for a camera operating in a simulated long exposure image capture mode without the benefit of enhanced pixel weighting operations. As illustrated by line 224, the clipped pixel value has a moderate impact on the running average just after it is captured (i.e., beginning at T=12), but this impact is both smaller than it should have been (since the pixel's true intensity value of 50,000 is only recorded as being 1,023) and wears off more quickly over time as more pixel samples are obtained by the image sensor with values around 50.

Several strategies may be employed to attempt to work around the limitations presented when accumulating image capture brackets with clipped pixels. For example, the analog gain of the sensor could be reduced to underexpose the image, which would increase the amount of headroom for highlights, but would do so at the expense of recovering shadow detail and would introduce more noise into the captured images. Further, a scheme could attempt to capture a mix of bracketed captures with difference gains (e.g., as is done in typical high dynamic range (HDR) imaging). However, this approach may result in temporal inconsistency issues, especially with moving point light sources in the scene. Finally, rather than performing a simple average of the intensity values of the pixels in each of the captured images being combined in the fusion operation to obtain the resultant pixel value in the output fused image, the intensity values could be accumulated in a non-linear space, e.g., a Lp norm of the intensity values could be computed (e.g., where p=2). However, such an approach could also result in the improper changes in color for color trails, e.g., where one or more of the color component values is not clipped. Further, using a non L norm (i.e., simple mean) could result in sub-optimal temporal noise reduction. Thus, according to embodiments disclosed herein, a novel pixel weighting operation is employed, such that the strength of each pixel sample's contribution to the resultant fused pixel value is dependent on its intensity.

Graph 250 illustrates an exemplary pixel weighting function that may be applied to pixels during one or more pixel weighting operations described herein. As illustrated, over the observed pixel intensity range from 0 up to a transition region 254 (beginning at around an intensity value of 950 out of 1,023 in the example of graph 250), pixels may be assigned a weight of '1.' In other words, the pixel sample will not have a disproportionate influence on the final fusion result. However, pixels having intensity values falling within the transition region 254 (i.e., beginning at point 252 along the weighting function) will have weights significantly greater than '1.' As illustrated, the weighting value applied to pixels may ramp up in the transition region 254, to where fully-saturated pixels (i.e., pixels having an observed intensity value of 1,023) will be given a weight close to 1,000. In other words, a saturated pixel value in a captured image will be treated as thought it was actually observed to have a value around 1,000,000 (i.e., 1,023*1,000), even though the image sensor is only capable of observing values up to 1,023.

As may now be appreciated, weighting this clipped pixel value so heavily may help ensure that its effect is still seen in the resultant fused image-even if averaged together with many other "non-clipped" corresponding pixels in the subsequent fusion operations used to generate the simulated long exposure image. In other words, the pixel weighting operation may be configured to assign a weight to a pixel based, at least in part, on how close the pixel's value is to a maximum observable pixel value for the image capture device that captured the pixel. In other embodiments, a transition region may not necessarily be employed, i.e., any additional weighting may be applied only to pixels that are fully clipped, with all other pixels receiving a weight of '1.' Thus, graph 250 is merely exemplary, and the weighting function used in a given system may be tuned to the needs of a given implementation.

Exemplary Memory-Efficient Image Fusion Operations

Referring now to FIG. 3A, an overview of a process 300 for performing memory-efficient image fusion operations is illustrated, according to one or more embodiments. Each horizontal arrow 301 in FIG. 3A represents an image that is captured by an image capture device of an electronic device, and timeline 303 represents the fact that images illustrated further down on the page were captured at a later moment in time than images captured above them on the page. As shown in FIG. 3A, to improve performance and memory efficiency, a set of M images may be broken down into two or more sub-sets or "batches" of images for fusion operations. In some instances, the number of images, M, may be known when the capture operation is initiated, while, in other instances, the number of images that will be captured will not be known a priori, in which case the quantity, M, simply represents the number of images that will eventually be captured before the capture operations are stopped and an output fused image is produced.

In some embodiments, the captured images may comprise a first batch of N images (302) and K additional subsequent batches of images ($312_1 \ldots 312_K$). In some implementations, e.g., for performance reasons, the subsequent batches of images 312 may comprise fewer images, e.g., one fewer image (i.e. N-1 images) than the first batch of images 302, though such a choice is not strictly necessary.

Once the first batch of images 302 has been captured, at block $308_0$, a first fusion operation may be performed on the first batch of images 302. The output of this first fusion operation may comprise what will be referred to herein as an "intermediate fusion image" $310_0$, designated as $I_0$, as well as an initial weight map $309_0$, designated as $W_0$.

As described above with reference to FIG. 1, according to some embodiments, the weight map 309 may be stored at a significantly reduced resolution as compared to the resolution of the images in the obtained batches of images. For example, in some instances, the weight map may be downscaled by a factor of 4 (or more) in each dimension from the obtained images. If the weight map is stored at a reduced resolution from the obtained images, it may be necessary to upscale the weight map prior to being used in a fusion operation. According to some embodiments, the weight maps may be upscaled using one or more filters, e.g., guided filters, bilateral filters, bilateral guided filters, etc. For example, according to some such embodiments, the guided filters may be guided by the intermediate fusion image result produced by the immediately preceding fusion sequence. In some cases, guided filters may be used independently on each image channel, e.g., on a luminance channel and one or more chroma channels. However, in some cases, e.g., when the values in the weight map are closely correlated to values in the luminance channel, the guided filters may be guided specifically by the luminance channel of the previous intermediate fusion image result, and the upscaling of the weight map values to the chroma channels may be derived from the result of applying the guided filter to the preceding image's luminance channel.

The intermediate fusion image, $I_0$ ($310_0$), and initial weight map, $W_0$ ($309_0$), may then be carried forward as inputs to the next subsequent fusion operation, shown at block $308_1$, which fusion operation $308_1$ may then be performed using: the first subsequent batch of images, $312_1$; intermediate fusion image, $I_0$ ($310_0$), and an updated, e.g., accumulatively updated, weight map, $W_1$ ($309_1$). As described above, according to some embodiments, the value in the weight map corresponding to each pixel location in the obtained image may simply be incremented by 1 for each additional image that is being pulled into the fusion operation-unless a given pixel is clipped (or sufficiently close to being clipped) that a weighting function, such as the exemplary weighting function described above with reference to graph 250, determines that a weight value greater than 1 should be applied to the pixel from the current image an accumulated to the running total for the respective pixel location in the weight map 309.

The intermediate fusion image generated by each subsequent fusion operation may be designated and/or referred to herein as the "current" intermediate fusion image, i.e., it is the current intermediate fusion image until it is replaced by the intermediate fusion image generated by the next subsequent fusion operation. According to some embodiments, a normalization operation is applied to the accumulated weights with each subsequent fusion operation, such that the subsequent fusion operations could be stopped at any time, and the last-produced intermediate fusion image would have the correct results.

This iterative process may then continue indefinitely, e.g., until a user indicates a desire to stop or cancel the image capture operation, or until a determined set of M images 314 have all been captured, with each subsequently-generated current intermediate fusion image, $I_K$, carried forward, along with the accumulated weight map $309_K$, to the fusion operation for the next batch of captured images 312, until the process 300 terminates. Upon termination, the final current intermediate fusion image, $I_K$, may be used and/or stored as the output fused image 216, subject to any desired post-processing or tuning performed on the fused output fused image 216.

Figure 3B:
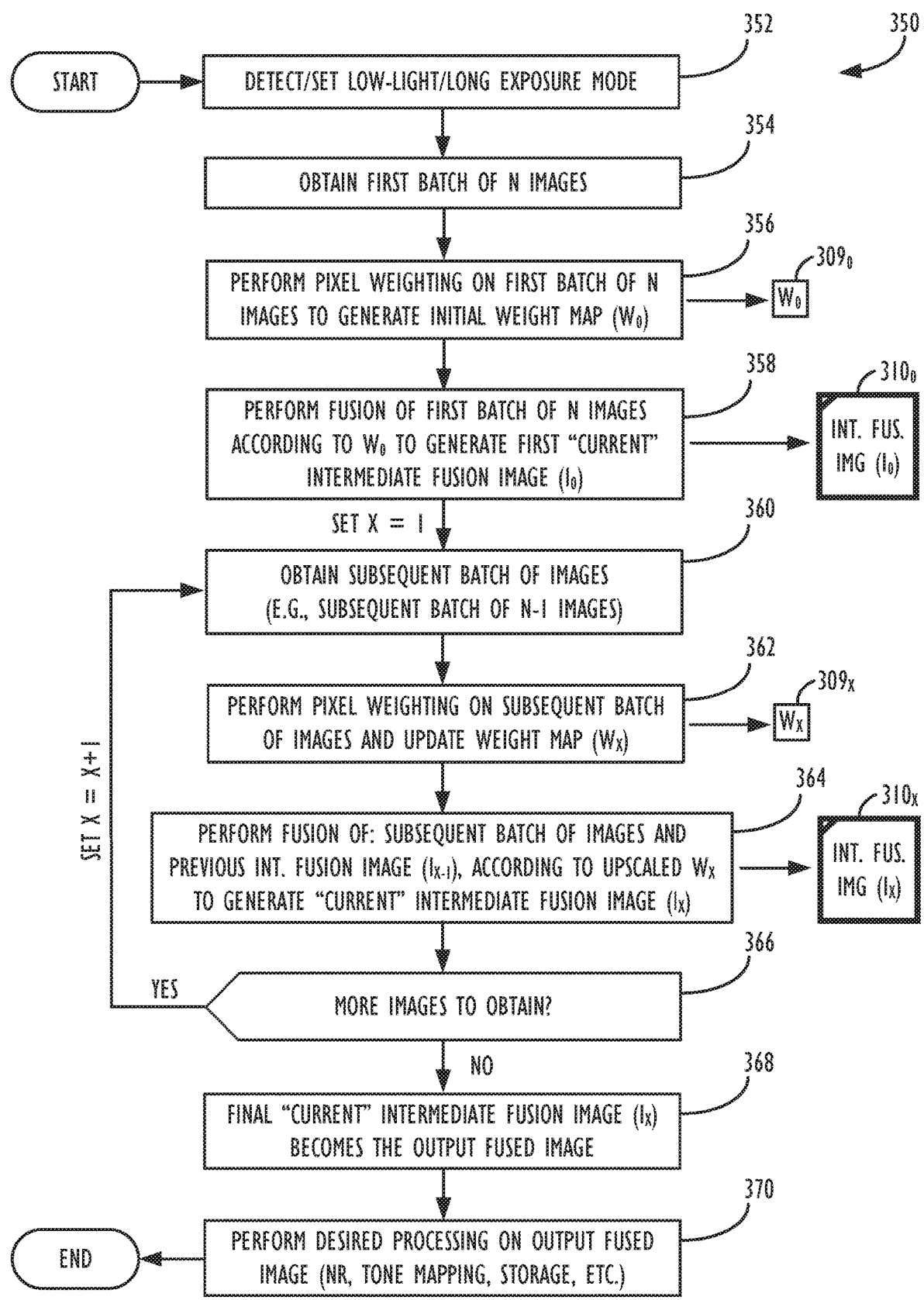
FIG. 3B is flow chart illustrating a method of performing memory-efficient image fusion operations, according to one or more embodiments.

Referring now to FIG. 3B, a flow chart illustrating a method 350 of performing memory-efficient image fusion operations is illustrated, according to one or more embodiments. First, at Step 352, an electronic device having one or more image capture devices may detect and/or be explicitly set into a low-light conditions and/or a simulated long exposure image capture mode. In some embodiments, this may comprise detecting that the one or more image capture devices have been stationary for a threshold amount of time. In still other embodiments, one or more machine learning (ML) techniques and/or readings from device sensors (e.g., NFC sensors) may be employed to make a determination that the device is mounted on a tripod or should otherwise enter into the low-light conditions and/or a simulated long exposure image capture mode, i.e., such that a user would not have to explicitly set the device in such a mode.

Next, at Step 354, a first batch of N images may be obtained. The N images may represent a subset of a total set of M images that will be captured for a given simulated long exposure image capture operation. The size of the first batch of images, N, may also be determined based, at least in part, on the amount of storage space available to hold captured images in memory on an electronic device during a real-time, e.g., progressive, fusion operation.

Next, at Step 356, pixel weighting operations may be performed on the pixels in the images of the first batch of N images, in order to generate an initial weight map, $W_0$ ($309_0$). As described above, e.g., with reference to graph 250, if there are 4 images in the first batch of images, and none of the pixels in any of the 4 images are clipped or near-clipped (or otherwise assigned a value of greater than 1 by a weighting function), then the value in the initial weight map for every pixel location will simply be '4' (i.e., 1+1+1+1, for each of the four images in the first batch of images), and each image in the initial batch will contribute equally to the fusion operation at each pixel location (unless the fusion operation is otherwise modified on some other basis, e.g., the relative exposure times of the images in the batch, etc.). According to some embodiments, it is advantageous to store the weight map at a much lower resolution than the obtained images for memory efficiency, and then perform intelligent upscaling operations (e.g., using guided filters) when applying the weights to the higher resolution luminance (or chroma) channels of the obtained images. In some such embodiments, an amount to increase the values stored in the weight map by may be calculated for each luminance pixel in the obtained image. These calculated values may then be downsampled by the appropriated scaling factor (e.g., by averaging a neighborhood of calculated weight values) and applied (e.g., accumulated) in the weight map.

Next, at Step 358, fusion operations may be performed on the first batch of N images according to the initial weight map, $W_0$ ($309_0$), wherein the result of the fusion operation of Step 358 comprises the first "current" intermediate fusion image, $I_0$ ($310_0$). As stated above, the most-recently generated intermediate fusion image will also be referred to herein as the "current" intermediate fusion image, i.e., it is the fusion result for the current iteration of the progressive fusion operation 350.

Next, a loop variable, x, may be initialized, e.g., with a value of 1, and then used to track the intermediate fusion images generated by the iterations of the subsequent fusion sequence comprising Steps 360, 362, and 364, which will now be described in greater detail. At Step 360, the process 350 may obtain a subsequent batch of images. In some embodiments, each subsequent batch of images may contain fewer images (e.g., one less image, or N-1 images) than the first batch of N images obtained at Step 354. As will be explained below, this may enable the method to carry forward one or more images and/or fusion results (e.g., accumulative weight maps) from earlier iterations or earlier steps in the process 350 to subsequent fusion operations-without exceeding any memory limitations of the relevant electronic processing device performing method 350. However, if desired, other implementations may utilize subsequent batches of images having the same (or a larger) number of images as the first batch of images obtained at Step 354, as well.

At Step 362, pixel weighting operations may be performed on the pixels in the images of the subsequent batch of images, in order to generate an updated weight map, $W_X$ (309$_X$). As described above, e.g., with respect to graph 250, the weights assigned to the pixels in the subsequent batch of images may also be determined by applying the respective pixel intensity values of each image to a pixel weighting function. In some embodiments, the values determined by applying the pixel weighting function may simply be added to the values already stored in the weight map, i.e., the values in the weight map for each respective pixel location may simply continue to accumulate over time as additional images are captured during a single simulated long exposure image capture operation. As mentioned above, in some instances, the accumulative weight values may be determined at the resolution of one of the channels (e.g., the luminance channel) of the obtained images and then downsampled to the lower resolution of the weight map before being applied (e.g., accumulated) in the weight map.

At Step 364, a subsequent fusion operation may be performed on: the subsequent batch of images (which may, as described above, contain, N-1 images) and the current intermediate fusion image (i.e., from the previous iteration of the loop comprising Steps 360, 362, and 364), $I_{X-1}$. As descried above, the fusion operation at 364 may be performed according to the updated (and, if necessary upscaled) weight map, $W_X$ (309$_X$) calculated at Step 362. The result of the fusion operation of Step 364 comprises an updated fused image, which will be designated as the new "current" intermediate fusion image, $I_X$ (310$_X$), and which, as described above, may be carried forward as one of the inputs to the next iteration of the subsequent fusion sequence comprising Steps 360, 362, and 364.

At Step 366, an evaluation may be made as to whether there are still more images to obtain, e.g., whether the set of M images have all been captured and/or whether a user has canceled or otherwise terminated the simulated long exposure image capture operation. If there are more images to obtain (or no indication to stop obtaining subsequent batches of images has otherwise been received), i.e., "YES" at Step 366, the process may increment the loop variable, x, and return to Step 360 to begin the next iteration of the subsequent fusion sequence comprising Steps 360, 362, and 364 by capturing the next subsequent batch of images. If, instead, all determined images have been obtained (or an indication to stop obtaining subsequent batches of images has otherwise been received), i.e., "NO" at Step 366, the process may proceed to Step 368.

At Step 368, i.e., following the completion of the last subsequent fusion sequence, the current intermediate fusion image, $I_X$ (310$_X$), from the final iteration of the loop comprising Steps 360, 362, and 364 may become the output fused image for the fusion operation of method 350. As may now be appreciated, no matter how many images, M, are captured in total to contribute to the fusion operation, the number of images that need to be held in memory at any one time never exceed the number of images involved in the subsequent fusion operation at Step 364, e.g., an intermediate fusion image from the previous loop iteration and the number of images that are in a subsequently captured batch of images (e.g., N-1) (in addition to whatever amount of memory the low resolution weight map takes up). This scheme essentially allows for the capture of images (whose information may contribute to a fusion operation) to be carried on indefinitely—and without exceeding memory limitations of the relevant electronic device.

Finally, at Step 370, any desired post-processing (e.g., noise reduction, tone mapping, cropping, rotation, etc.) may be performed on the output fused image, which may also include storing the output fused image to memory, e.g., on the electronic device or at some other storage location, and then the method 350 may terminate.

Exemplary Electronic Device

Figure 4:
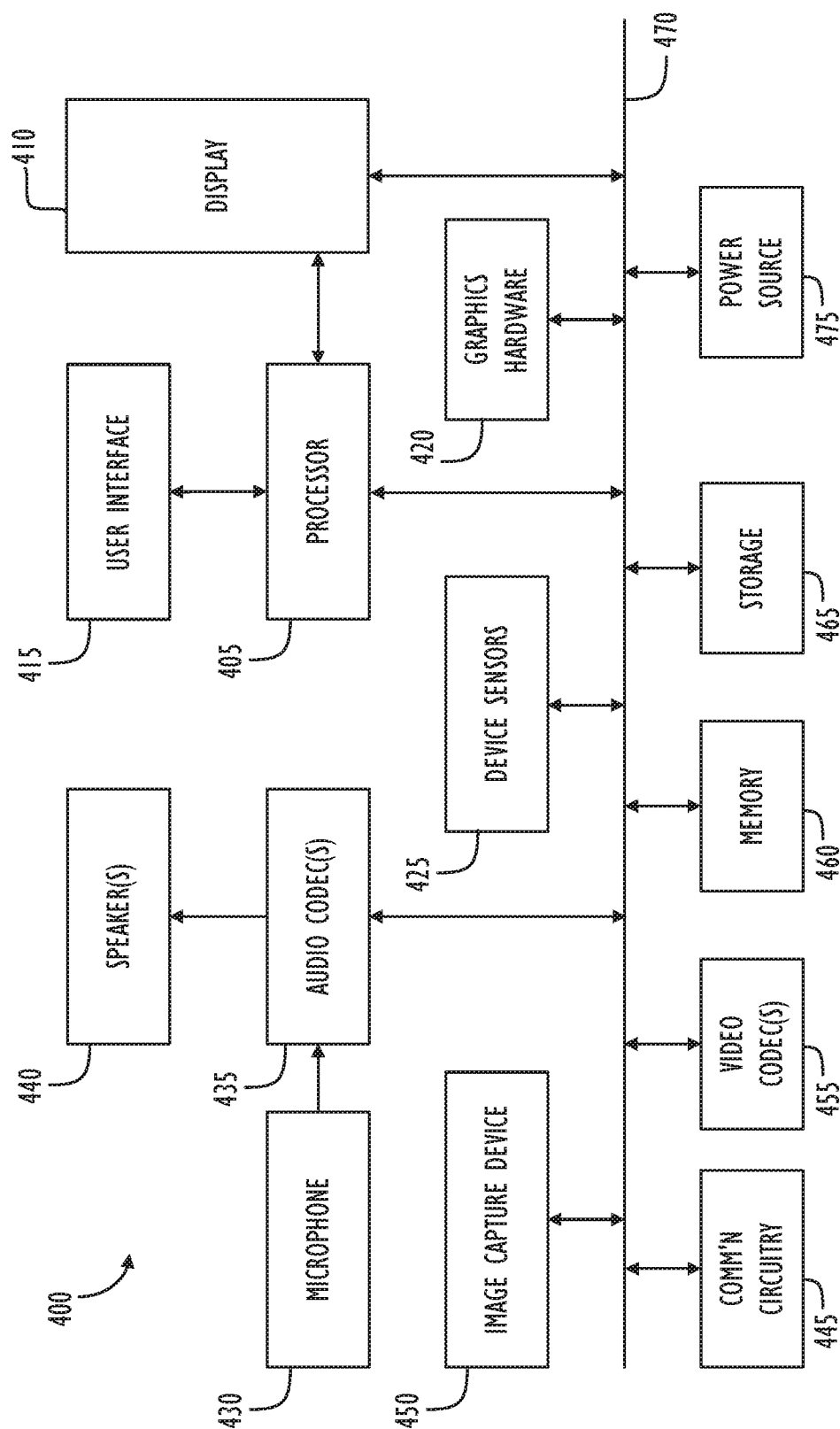
FIG. 4 is a block diagram illustrating a programmable electronic computing device, in which one or more of the techniques disclosed herein may be implemented.

Referring now to FIG. 4, a simplified functional block diagram of illustrative programmable electronic computing device 400 is shown according to one embodiment. Electronic device 400 could be, for example, a mobile telephone, personal media device, portable camera, or a tablet, notebook or desktop computer system. As shown, electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, image capture device 450, which may, e.g., comprise multiple camera units/optical image sensors having different characteristics or abilities (e.g., SIS, HDR, OIS systems, optical zoom, digital zoom, etc.), video codec(s) 455, memory 460, storage 465, and communications bus 470.

Processor 405 may execute instructions necessary to carry out or control the operation of many functions performed by electronic device 400 (e.g., such as the generation and/or processing of images in accordance with the various embodiments described herein). Processor 405 may, for instance, drive display 410 and receive user input from user interface 415. User interface 415 can take a variety of forms, such as a button, keypad, dial, a click wheel, keyboard, display screen and/or a touch screen. User interface 415 could, for example, be the conduit through which a user may view a captured video stream and/or indicate particular image(s) that the user would like to capture (e.g., by clicking on a physical or virtual button at the moment the desired image is being displayed on the device's display screen). In one embodiment, display 410 may display a live image preview stream as it is captured while processor 405 and/or graphics hardware 420 and/or image capture circuitry contemporaneously generate and store the video stream in memory 460 and/or storage 465. Processor 405 may be a system-on-chip such as those found in mobile devices and include one or more dedicated graphics processing units (GPUs). Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 perform computational tasks. In one embodiment, graphics hardware 420 may include one or more programmable graphics processing units (GPUs).

Image capture device 450 may comprise one or more camera units configured to capture images, e.g., images which may be processed to generate fused versions of said captured images, e.g., in accordance with this disclosure. Output from image capture device 450 may be processed, at least in part, by video codec(s) 455 and/or processor 405 and/or graphics hardware 420, and/or a dedicated image processing unit or image signal processor incorporated within image capture device 450. Images so captured may be stored in memory 460 and/or storage 465. Memory 460 may include one or more different types of media used by processor 405, graphics hardware 420, and image capture device 450 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to retain computer program instructions or code organized into one or more modules and written in any desired computer programming language. When executed by, for example, processor 405, such computer program code may implement one or more of the methods or processes described herein. Power source 475 may comprise a rechargeable battery (e.g., a lithium-ion battery, or the like) or other electrical connection to a power supply, e.g., to a mains power source, that is used to manage and/or provide electrical power to the electronic components and associated circuitry of device 400.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
    a memory;
    one or more image capture devices;
    a display;
    a user interface; and
    one or more processors operatively coupled to the memory, wherein the one or more processors are configured to execute instructions causing the one or more processors to:
        obtain a first batch of images captured by the one or more image capture devices;
        perform a pixel weighting operation on each image in the first batch of images to output a weight map;
        perform a first fusion operation on the first batch of images according to the weight map to output a first fused image;
        designate the first fused image as a current intermediate fusion image;
        successively perform a subsequent fusion sequence at least one time, wherein each subsequent fusion sequence comprises:
            obtaining a subsequent batch of images captured by the one or more image capture devices;
            performing a pixel weighting operation on each image in the subsequent batch of images to output an updated weight map;
            performing a subsequent fusion operation on: the subsequent batch of images and the current intermediate fusion image according to the updated weight map to output an updated fused image; and
            designating the updated fused image as the current intermediate fusion image; and
        following completion of the last subsequent fusion sequence, store the current intermediate fusion image as an output fused image in the memory.

2. The device of claim 1, wherein the instructions further comprise instructions causing the one or more processors to:
    detect that the one or more image capture devices have been stationary for a threshold amount of time prior to obtaining the first batch of images.

3. The device of claim 1, wherein the weight map comprises a plurality of fusion weight values, and wherein the weight map has a lower resolution than the obtained images.

4. The device of claim 3, wherein the instructions to perform a subsequent fusion operation according to the updated weight map further comprise instructions causing the one or more processors to:
    upscale the updated weight map to the resolution of the obtained images prior to performing the subsequent fusion operation.

5. The device of claim 4, wherein the instructions to upscale the updated weight map further comprise instructions to:
    upscale the updated weight map using one or more filters.

6. The device of claim 5, wherein the one or more filters are guided, at least in part, by the current intermediate fusion image output by the previous subsequent fusion sequence.

7. The device of claim 1, wherein the pixel weighting operation is configured to assign a weight to a pixel based, at least in part, on how close the pixel's value is to a maximum observable pixel value for the image capture device that captured the pixel.

8. A non-transitory program storage device comprising instructions stored thereon to cause one or more processors to:
    obtain a first batch of images captured by one or more image capture devices;
    perform a pixel weighting operation on each image in the first batch of images to output a weight map;
    perform a first fusion operation on the first batch of images according to the weight map to output a first fused image;
    designate the first fused image as a current intermediate fusion image;
    successively perform a subsequent fusion sequence at least one time, wherein each subsequent fusion sequence comprises:
        obtaining a subsequent batch of images captured by the one or more image capture devices;
        performing a pixel weighting operation on each image in the subsequent batch of images to output an updated weight map;
        performing a subsequent fusion operation on: the subsequent batch of images and the current intermediate fusion image according to the updated weight map to output an updated fused image; and
        designating the updated fused image as the current intermediate fusion image; and
    following completion of the last subsequent fusion sequence, store the current intermediate fusion image as an output fused image in a memory.

9. The non-transitory program storage device of claim 8, wherein the weight map comprises a plurality of fusion weight values, and wherein the weight map has a lower resolution than the obtained images.

10. The non-transitory program storage device of claim 9, wherein the instructions to perform a subsequent fusion operation according to the updated weight map further comprise instructions causing the one or more processors to:

upscale the updated weight map to the resolution of the obtained images prior to performing the subsequent fusion operation.

11. The non-transitory program storage device of claim 10, wherein the instructions to upscale the updated weight map further comprise instructions to:

upscale the updated weight map using one or more filters.

12. The non-transitory program storage device of claim 11, wherein the one or more filters are guided, at least in part, by the current intermediate fusion image output by the previous subsequent fusion sequence.

13. The non-transitory program storage device of claim 8, wherein the pixel weighting operation is configured to assign a weight to a pixel based, at least in part, on how close the pixel's value is to a maximum observable pixel value for the image capture device that captured the pixel.

14. A method, comprising:

obtaining a first batch of images captured by one or more image capture devices;

performing a pixel weighting operation on each image in the first batch of images to output a weight map;

performing a first fusion operation on the first batch of images according to the weight map to output a first fused image;

designating the first fused image as a current intermediate fusion image;

successively performing a subsequent fusion sequence at least one time, wherein each subsequent fusion sequence comprises:

obtaining a subsequent batch of images captured by the one or more image capture devices;

performing a pixel weighting operation on each image in the subsequent batch of images to output an updated weight map;

performing a subsequent fusion operation on: the subsequent batch of images and the current intermediate fusion image according to the updated weight map to output an updated fused image; and designating the updated fused image as the current intermediate fusion image; and following completion of the last subsequent fusion sequence, storing the current intermediate fusion image as an output fused image in a memory.

15. The method of claim 14, further comprising:

detecting that the one or more image capture devices have been stationary for a threshold amount of time prior to obtaining the first batch of images.

16. The method of claim 14, wherein the weight map comprises a plurality of fusion weight values, and wherein the weight map has a lower resolution than the obtained images.

17. The method of claim 16, wherein performing a subsequent fusion operation according to the updated weight map further comprises:

upscaling the updated weight map to the resolution of the obtained images prior to performing the subsequent fusion operation.

18. The method of claim 17, wherein upscaling the updated weight map further comprises:

upscaling the updated weight map using one or more filters.

19. The method of claim 18, wherein the one or more filters are guided, at least in part, by the current intermediate fusion image output by the previous subsequent fusion sequence.

20. The method of claim 14, wherein the pixel weighting operation is configured to assign a weight to a pixel based, at least in part, on how close the pixel's value is to a maximum observable pixel value for the image capture device that captured the pixel.

* * * * *